United States Patent [19]

Bowlin

[11] Patent Number: 5,243,888
[45] Date of Patent: Sep. 14, 1993

[54] PIVOTING CARRIAGE AND SAW

[76] Inventor: William P. Bowlin, 9372 Bowlin Dr., Shreveport, La. 71129

[21] Appl. No.: 762,543

[22] Filed: Sep. 17, 1991

[51] Int. Cl.$^5$ ............................................. B27B 29/00
[52] U.S. Cl. ..................................... 83/76.8; 83/75.5; 83/367; 83/368; 83/731; 83/435.1; 83/789; 83/810; 144/378
[58] Field of Search ............... 83/72, 74, 75.5, 76.8, 83/76.9, 367, 368, 410, 410.8, 410.9, 412, 425, 435.1, 708, 789, 731, 809–812; 144/378; 364/474.09

[56] References Cited

U.S. PATENT DOCUMENTS

| 2,850,130 | 9/1958 | Mater | 83/74 X |
|---|---|---|---|
| 3,799,024 | 3/1974 | Alexander | 83/812 X |
| 3,801,089 | 4/1974 | Fukugami et al. | 83/74 |
| 3,811,353 | 5/1974 | Miles | 83/71 |
| 3,848,490 | 11/1974 | Arel | 83/49 |
| 4,085,638 | 4/1978 | Fifer | 83/71 |
| 4,145,723 | 3/1979 | Mucha et al. | 360/79 |
| 4,330,019 | 5/1982 | Murphy et al. | 83/368 X |
| 4,449,557 | 5/1984 | Makela et al. | 144/378 X |
| 4,534,002 | 8/1985 | Urban | 364/475 |
| 4,548,247 | 10/1985 | Eklund | 83/76.8 X |
| 4,572,256 | 2/1986 | Rautio | 144/378 X |
| 4,665,786 | 5/1987 | Shields | 83/367 X |
| 4,758,960 | 6/1988 | Jung | 364/470 |
| 4,947,909 | 8/1990 | Stroud | 83/76.8 X |

FOREIGN PATENT DOCUMENTS 1455175 11/1976 United Kingdom ............... 83/810

Primary Examiner—Eugenia Jones
Attorney, Agent, or Firm—John M. Harrison

[57] ABSTRACT

A pivoting carriage and saw which is characterized in a preferred embodiment by a carriage capable of receiving curved logs and pivotally mounted on a linear-operated trolley for engaging the logs with a pivoting band saw and cutting a selected non-linear path through the curved logs. In a most preferred embodiment the band saw is pivotally mounted adjacent to the trolley carriage and log and a computerized control system is coupled to fluid-operated cylinders mounted on log-adjusting knees on the carriage and on other fluid-operated cylinders provided on the carriage itself and on the band saw and used to select and control desired cutting paths through the logs.

7 Claims, 5 Drawing Sheets

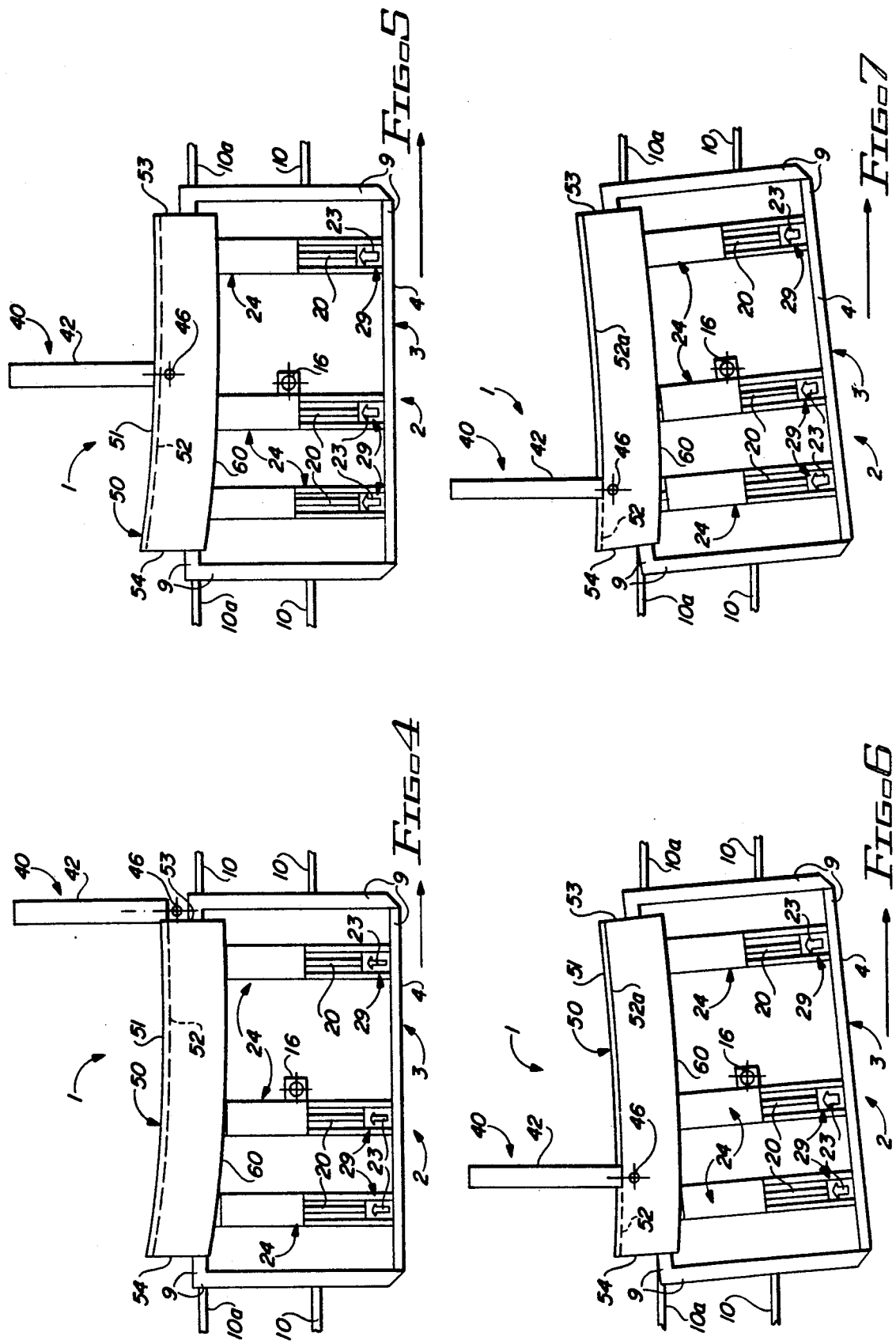

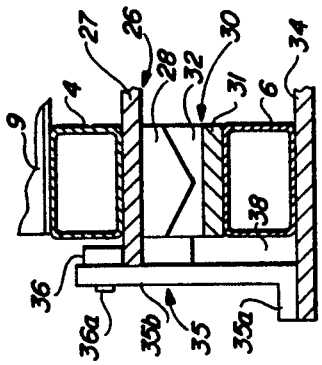
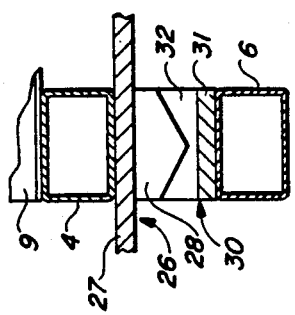
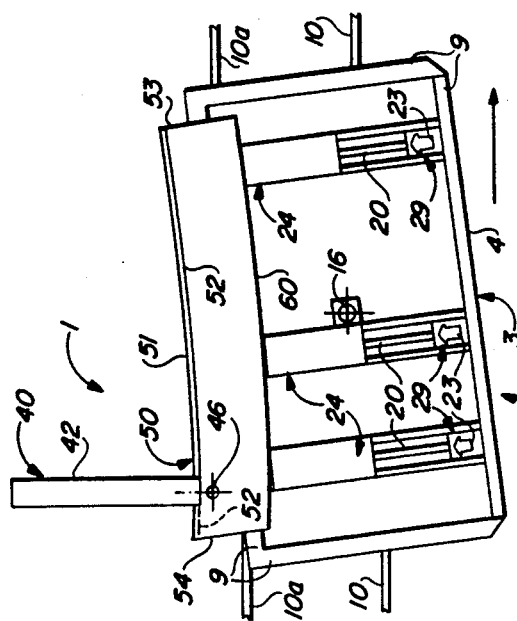
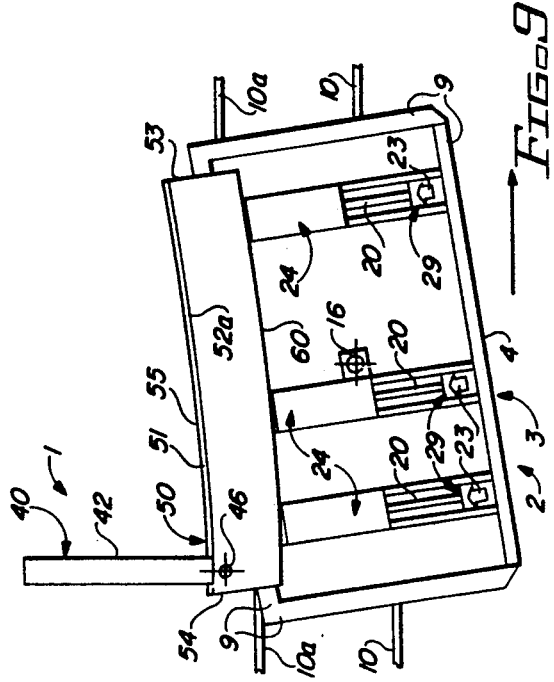
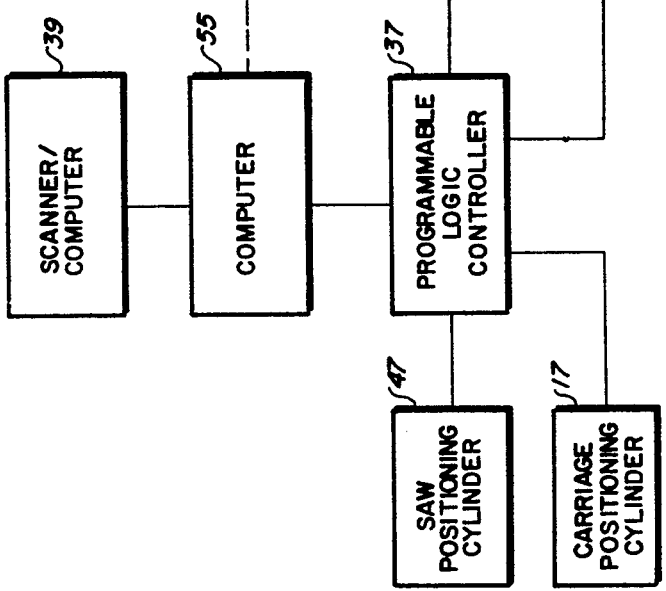

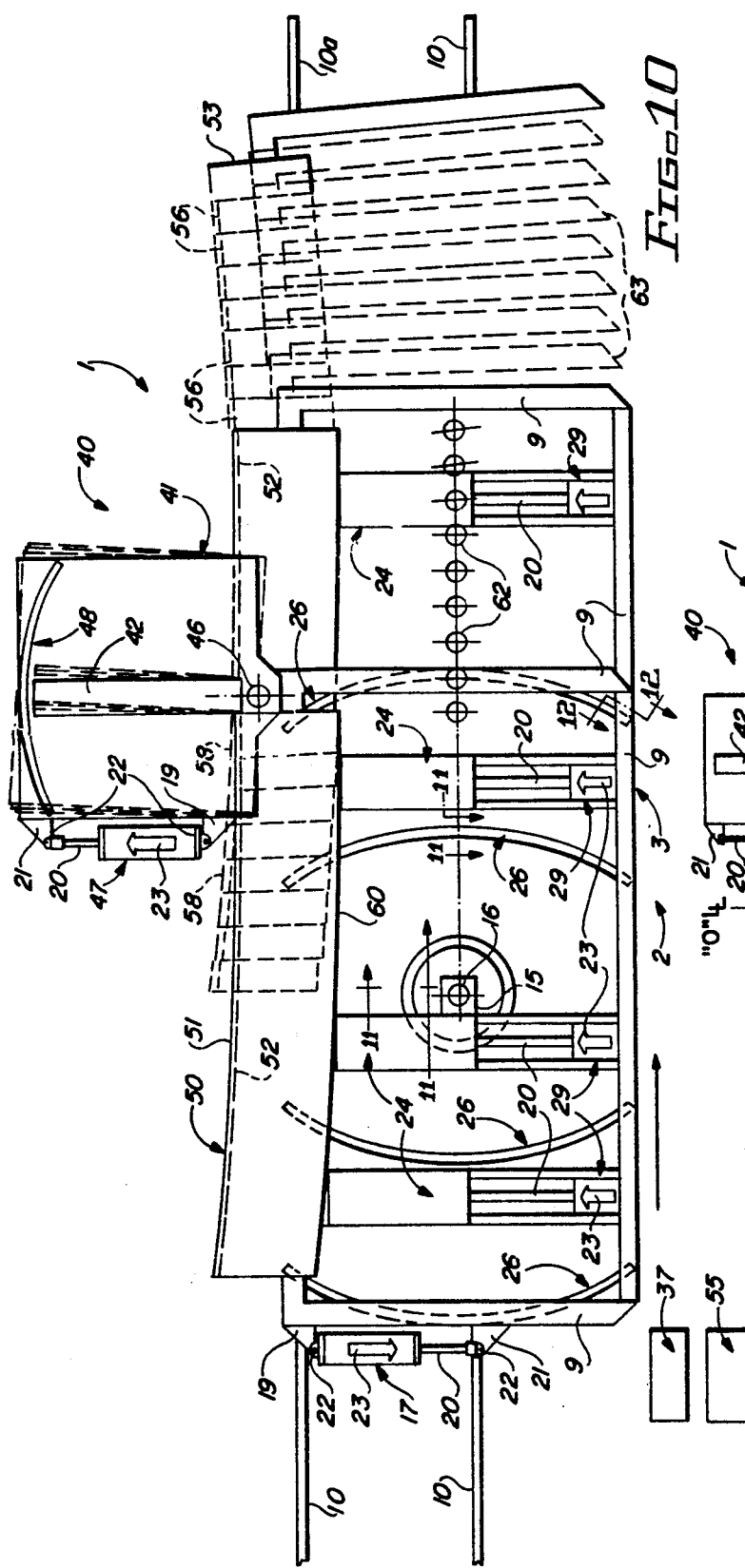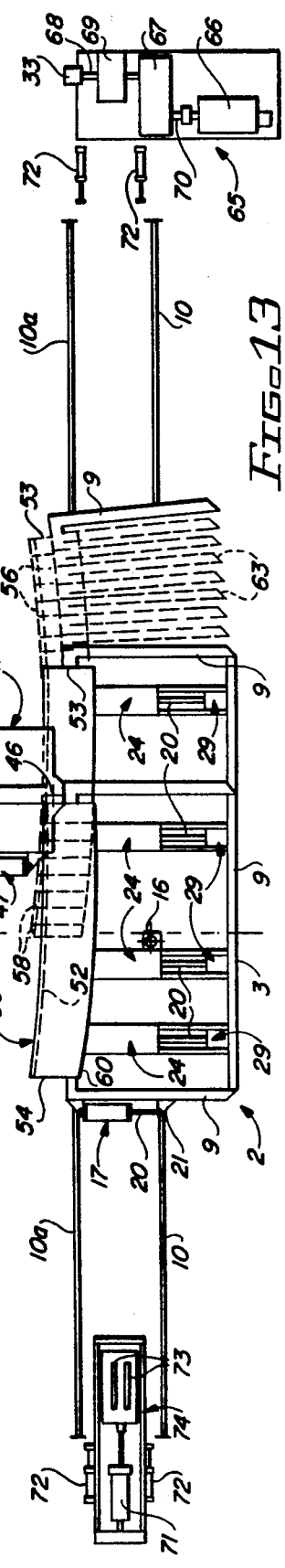

PIVOTING CARRIAGE AND SAW

BACKGROUND OF THE INVENTION

Field of the Invention

This invention relates to carriage and saw elements in sawmill operations and more particularly, to the cutting of curved logs along preselected curved saw paths by a pivotally-mounted band saw and pivoting carriage operated manually or by a computerized control system. In a first preferred embodiment the band saw and carriage are pivotally mounted and coupled to interfacing programmable logic controller equipment and an associated scanner/computer, to facilitate optimum selection and control of desired blade paths through a curved log and optimizing the wood products from the log. In a second preferred embodiment of the invention a computer is provided in association with the programmable logic controller to receive data from the scanner/computer and a carriage location encoder and operate the programmable logic controller to effect the desired cutting path or paths through each log. The manually or computer-operated programmable logic controller is linked to linear positioners mounted on corresponding fluid-operated cylinders provided on both the band saw and the carriage, as well as the log-positioning knees on the carriage, for securing the respective logs on the carriage, orchestrating pivoting of the band saw on a fixed band saw base and the carriage on a linear-travelling trolley and facilitating the desired optimum cut(s) through the log.

In sawmill operations it is sometimes desirable to cut a curved log approximately along the line of curvature inwardly of the concave bark layer to produce lumber of optimum selection, grade and quality. This technique is impossible under ordinary circumstances using either a band saw or circular saw, because conventional carriages which carry the logs are normally operated in a linear fashion to force the logs into the blade of the corresponding band saw or circular saw along a straight line and effect the desired linear cut. Since the carriages operate in a straight line, cuts through the logs are normally also straight. Accordingly, there is normally no effort made to cut a curved or crooked log according to its natural curvature in order to realize lumber of optimum quality and selection from the log.

It is an object of this invention to provide a pivoting carriage and saw for cutting both straight and curved logs, wherein the pivoting carriage is pivotally adapted to maneuver the log into the path of a pivotally-mounted band saw blade throughout the length of the log, to facilitate cutting the log in a selected path.

Another object of this invention is to provide a new and improved pivoting carriage and band saw system for cutting curved logs along a selected curved path, which system includes a pivoting carriage mounted on a linear-operated trolley and adapted to receive and support a log, a pivoting band saw mounted on a fixed base or band mill located adjacent to the trolley and carriage, a scanner/computer for determining the optimum cutting path or paths for the band saw to optimize the wood products from the log and a programmable logic controller coupled to linear positioners mounted on fluid-operated cylinders provided on the carriage and band saw, wherein the carriage and band saw may be pivoted in concert by operation of the programmable logic controller to cut the log according to selected curved paths determined by the scanner/computer and optimize the wood products from the log.

Still another object of this invention is to provide a new and improved pivoting carriage and band saw assembly for sawmills, which assembly includes a pivotally-mounted carriage mounted on a linearly-operated trolley and adapted for receiving, supporting and positioning a curved log by use of sliding log-positioning knees, a band saw pivotally mounted on a fixed base adjacent to the carriage, a scanner/computer positioned to select an optimum cutting path or paths through the log and a computer-operated programmable logic controller system coupled to the scanner/computer and to linear positioners mounted on fluid-operated cylinders provided on the log-positioning knees, pivoting carriage and pivoting saw, for locating a log in proper position on the carriage, orchestrating pivoting movement of the carriage and saw according to scanned parameters of the log and cutting selected, optimum curved paths through the log from end to end to optimize the size and selection of wood products from the log.

A still further object of this invention is to provide a method for cutting a curved log and increasing the yield of wood products of optimum size and selection from the log, which method includes the steps of securing the log on a pivoting carriage in the path of a pivoting band saw scanning the log to determine optimum saw cuts through the log to produce lumber of optimum proportions and pivoting the carriage and band saw in concert by operation of a computerized control system to effect these saw cuts in the log.

SUMMARY OF THE INVENTION

These and other objects of the invention are provided in a pivotally-mounted carriage and band saw which includes a carriage pivotally mounted on a trolley, which trolley is constrained to move in a straight line by operation of a suitable drive system; a carriage location encoder provided in the drive system; a pivotally-mounted band saw mounted on a fixed base adjacent to the trolley and carriage, with the band saw blade provided in alignment with a curved log resting on the trolley; a scanner/computer positioned to select one or more optimum cutting paths through the log; and a computerized control system which includes a programmable logic controller electronically connected to linear positioners provided on fluid-operated cylinders mounted on log-positioning knees located on the carriage, on the carriage and trolley and on the band saw and fixed base, respectively; and a computer interfacing the scanner/computer, carriage location encoder and programmable logic controller, for initially adjusting a log on the carriage and orchestrating programmed pivoting of the carriage and band saw to cut one or more preselected, curved paths through the log and optimize wood products from the log.

A method for sawing a curved log and producing wood products of optimum size and selection from the log, which method includes the steps of using a computerized control system to secure the log on a pivoting carriage in the path of a pivoting band saw, scan the log to determine optimum saw cuts through the log to produce lumber of optimum selection and proportions and pivot the carriage and band saw in concert to effect these saw cuts in the log.

BRIEF DESCRIPTION OF THE DRAWINGS

The invention will be better understood by reference to the accompanying drawings wherein:

FIG. 4 is a plan view of the initial step in operation of the pivotal carriage and saw to cut a curved log;

FIG. 5 is a plan view of a first cutting sequence in operation of the pivoting carriage and saw;

FIG. 6 is a plan view of a second cutting sequence in operation of the pivoting carriage and saw;

FIG. 7 is a plan view of a third cutting sequence in operation of the pivoting carriage and saw;

FIG. 8 is a plan view of a fourth cutting sequence in operation of the pivoting carriage and saw;

FIG. 9 is a plan view of the final cutting sequence in operation of the pivoting carriage and saw;

FIG. 10 is a plan view of a second preferred embodiment of the pivoting carriage and saw of this invention;

FIG. 11 is a sectional view taken along line 11—11 of the pivoting carriage and saw illustrated in FIG. 10;

FIG. 12 is a sectional view taken along line 12—12 of the pivoting carriage and sa illustrated in FIG. 10;

FIG. 13 is a plan view of the pivoting carriage and sa in the trolley-operating environment; and FIG. 14 is a schematic of a preferred electronic interconnection system for operating the pivoting carriage and saw by means of a computerized control system.

DESCRIPTION OF THE PREFERRED EMBODIMENTS

Figure 1:
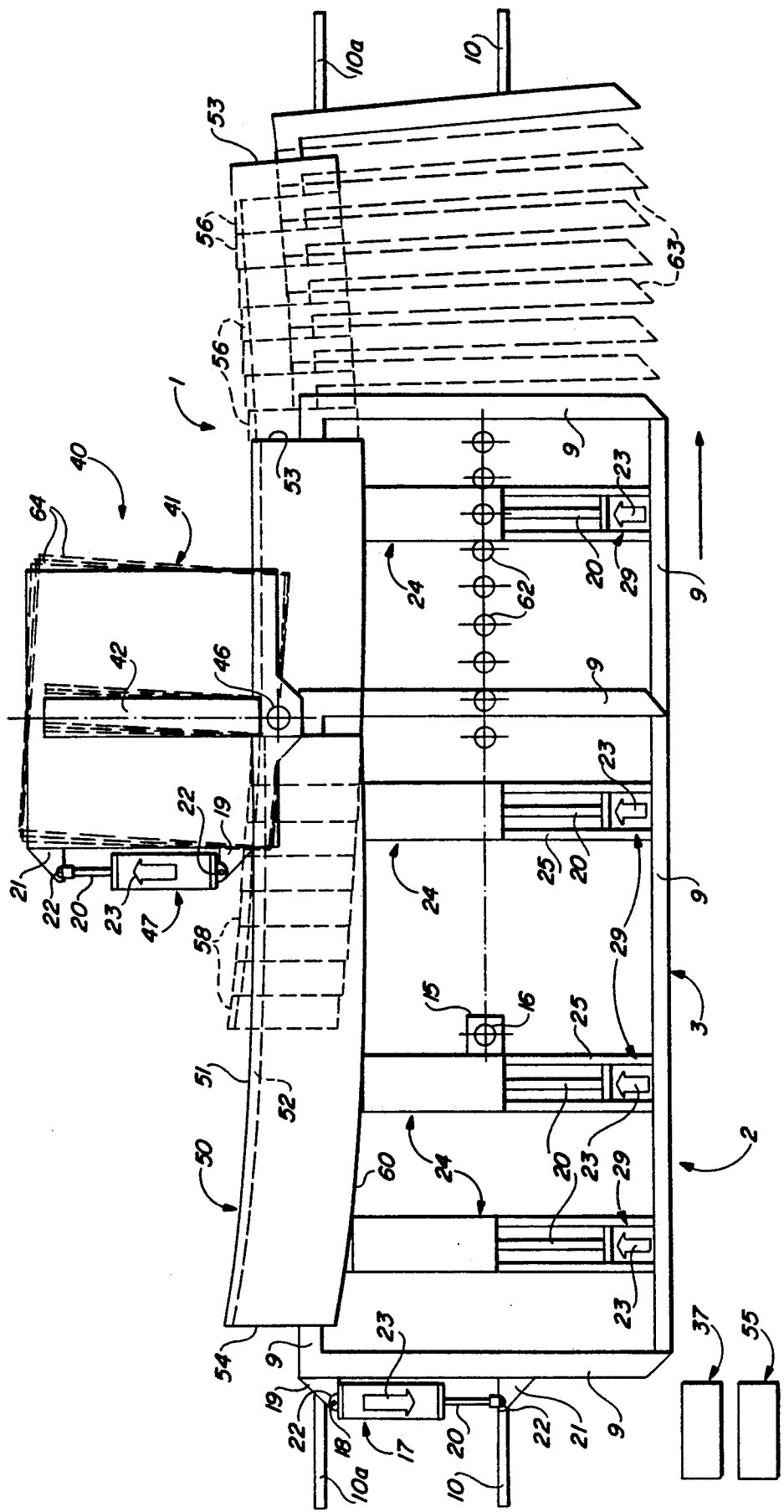
FIG. 1 is a plan view of a first preferred embodiment of the pivoting carriage and saw of this invention.
Figure 2:
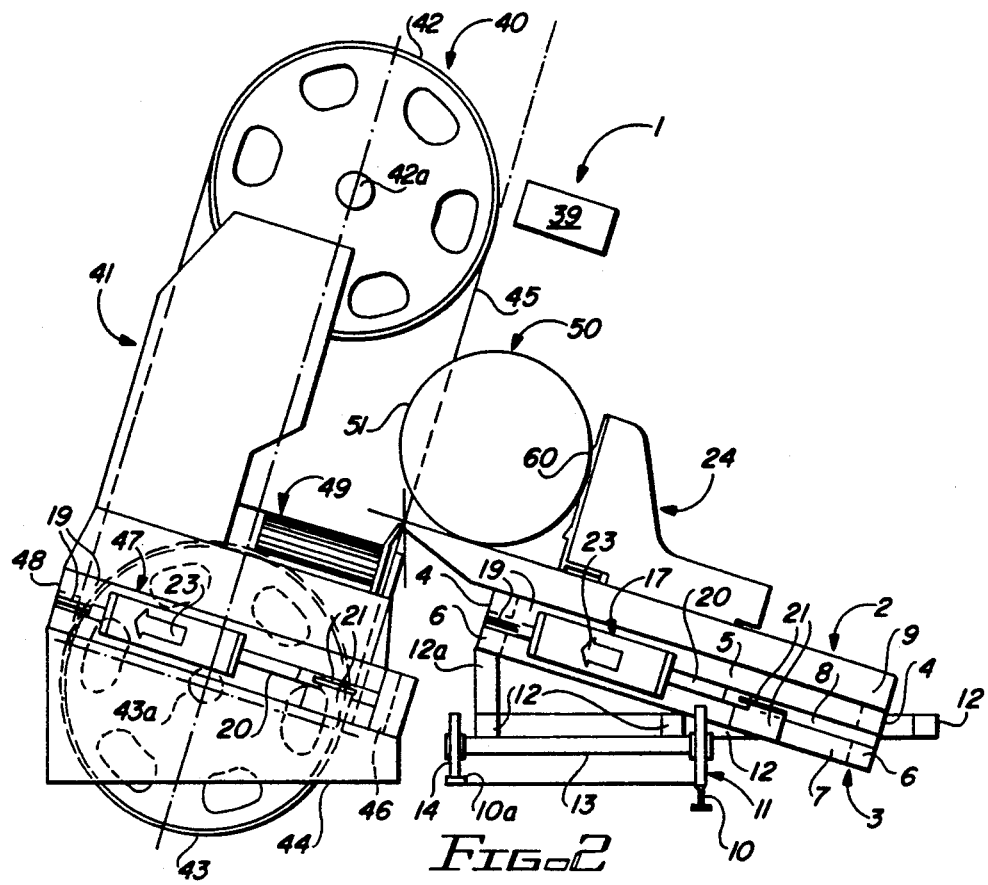
FIG. 2 is a front view of a tilted embodiment of the pivoting carriage and saw illustrated in FIG. 1.
Figure 3:
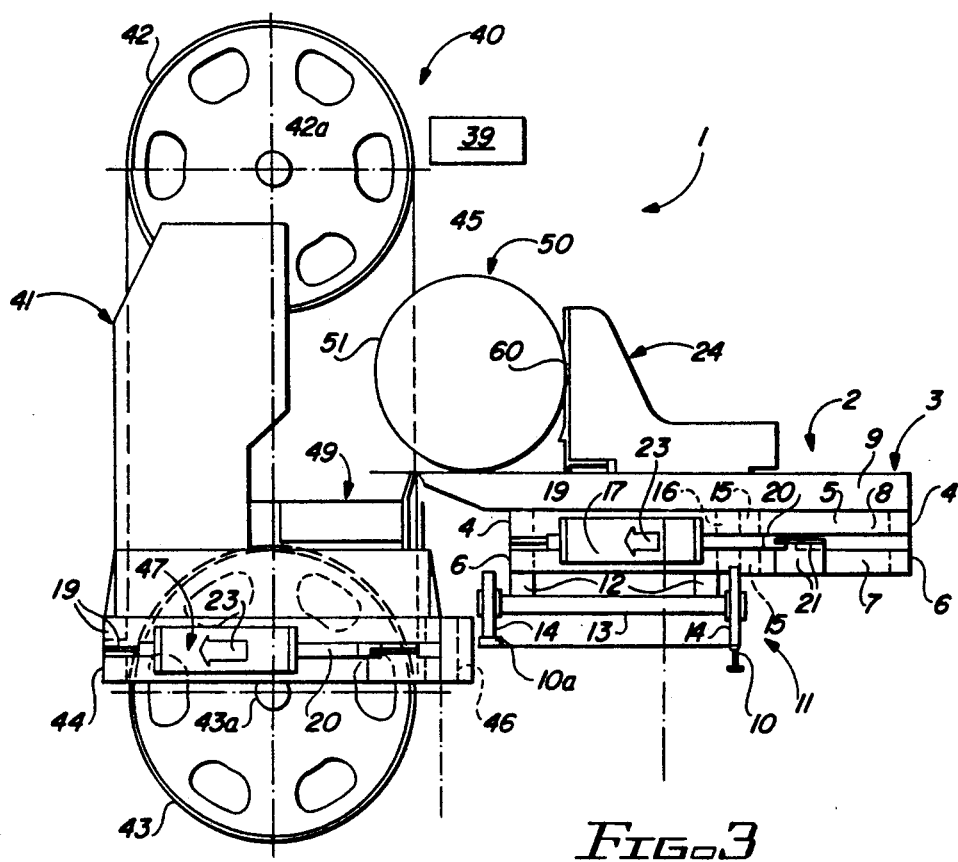
FIG. 3 is a front view of a horizontal embodiment of the pivoting carriage and saw illustrated in FIG. 1.

Referring initially to FIGS. 1-3 and 13 of the drawings, the pivoting carriage and saw of this invention is generally illustrated by reference numeral 1. The pivoting carriage and saw 1 includes a carriage 2, which includes a carriage frame 3 constructed of parallel, spaced upper side frame members 4 and connecting parallel, spaced upper end frame members 5, as illustrated in FIGS. 2 and 3. Lower side frame members 6 further extend parallel to each other and to the upper side frame members 4, respectively, and are connected by corresponding lower end frame members 7 which lie beneath and parallel to the respective upper side frame members 5, respectively, as further illustrated in FIGS. 2 and 3. Separation plates 8 are disposed between the respective upper side frame members 4, lower side frame members 6, upper end frame members 5 and lower end frame members 7, respectively, as still further illustrated in FIGS. 2 and 3. The carriage 2 is mounted on a carriage trolley 11 by means of parallel trolley beams 12 and in the case of the pivoting carriage and saw illustrated in FIG. 2, a tilt beam 12a, and a pair of trolley axles 13 (one of which is illustrated in FIGS. 2 and 3), are fitted with wheels 14, the inside set of which rest on a rail plate 10a. The outside set of wheels 14 engage a common conventional rail 10. Accordingly, it will be appreciated from a consideration of FIGS. 1-3 that the carriage trolley 11 is constrained to move in a linear relationship along the rail 10 and rail plate 10a in close proximity to the band saw 40. One of the outside wheels 14 is driven by a cable (not illustrated) to operate the carriage trolley 11 and carriage 2 in linear fashion, using a conventional cable drive system 65, illustrated in FIG. 13. The cable drive system includes a drive motor 66, connected by means of an input shaft 70 to a gearbox 67, which drives an output shaft 68. The output shaft 68 carries a cable drum 69, for receiving the cable (not illustrated) and a carriage location encoder 33. A take-up frame 74 encloses a pair of cable pulleys 73 and a hydraulic take-up bumper 71 on the opposite side of the carriage 2 and carriage trolley 11 from the drive motor 66 and outside bumpers 72 on both sides of the carriage 2 and carriage trolley 11 help cushion and smooth reversal of the carriage 2 and carriage trolley 11. Referring again to FIGS. 1-3 of the drawings, the upper portion of the carriage 2, defined by the upper side frame members 4 and upper end frame members 5, upon which the log support beams 9 are mounted, are pivotable about a carriage pivot pin 16 with respect to the lower portion of the carriage frame or lower side frame member 6 and lower end frame member 7. The carriage pivot pin 16 is seated in parallel pin plates 15 one of which is secured in the upper portion of the carriage frame 3 and the other in the bottom portion of the carriage frame 3, as illustrated in FIGS. 2 and 3. A carriage positioning cylinder 17 is mounted on the trailing end of the carriage 2 by means of a cylinder bracket 18 which is secured to a cylinder bracket plate 19, attached to a log support beam 9, as illustrated in FIGS. 1-3. The corresponding cylinder piston 20 is mounted by means of a mount pin 22 to the cylinder piston plate 21, attached to a lower end frame member 7, as further illustrated in FIGS. 2 and 3 and a linear positioner 23 is provided on the carriage positioning cylinder 17. Accordingly, operation of the carriage positioning cylinder 17 by extending and retracting the cylinder piston 20 effects controlled pivoting of the top portion of the carriage frame 3 with respect to the lower portion of the carriage frame 3 about the carriage pivot pin 16, as hereinafter further described. Three carriage knees 24 are slidably mounted on mount bars 25, which span the carriage frame 3 between the log support beams 9. Travel of the carriage knees 24 on the mount bars 25 is effected by knee cylinders 29, which include linear positions 23 and cylinder pistons 20, attached to the carriage knees 24, respectively, as illustrated in FIG. 1. Accordingly, it will be appreciated from a consideration of FIG. 1 that the carriage knees 24 may be slidably adjusted on the mount bars 25 by controlled operation of the knee cylinders 29 to engage a log 50 at various points, lock into position in conventional fashion and secure the log 50 on the log support beams 9 of the carriage frame 3.

Referring now to FIGS. 10-12 of the drawings, a set of carriage V-ways are generally illustrated by reference numeral 26 and are mounted in place of the separation plates 8, illustrated in FIGS. 1-3, on the upper side frame members 4 of the carriage frame 3 by means of carriage V-way mount plates 27, illustrated in FIGS. 10 and 11. Each of the carriage V-ways 26 is characterized by a wedge-shaped carriage V-way contact plate 28, mounted on a corresponding carriage V-way mount plate 27 and extending downwardly from the respective upper side frame members 4, as illustrated in FIG. 11. As illustrated in FIG. 10, in a most preferred embodiment of the invention, four curved carriage V-ways 26 are provided in the carriage 2 in spaced relationship, along with a circular carriage V-way 26 which encircles the carriage pivot pin 16, as illustrated. As further illustrated in FIGS. 10-12, the V-way receptacles 30 correspond to each of the carriage V-ways 26 and a V-way receptacle mount plate 31 receives a V-way receptacle contact 32 for engaging the carriage V-way contact plate 28 in the carriage V-ways 26, respectively.

In another preferred embodiment of the invention, close contact between the carriage V-ways 26 and the corresponding V-way receptacles 30 is maintained by pairs of retainers 35, each having a retainer foot 35a, which is welded or otherwise attached to a corresponding retainer mount plate 34 and a retainer leg 35b projecting from the retainer foot 35a upwardly and receiving a roller 36, mounted on a roller pin 36a, which roller 36 engages the top surface of the corresponding carriage V-way mount plate 27. The retainer leg 35b of each retainer 35 is spaced from corresponding lower side frame member 6 in the carriage 2 by means of a spacer 38 and in a most preferred embodiment of the invention the outer ones of the carriage V-ways 26 and corresponding V-way receptacles 30 are provided with a pair of retainers 35, each configured as illustrated in FIG. 12 while the inner ones of the carriage V-ways 26 and corresponding V-way receptacles 30 are mounted according to the configuration illustrated in FIG. 11.

Referring again to FIGS. 1-3 and 10 of the drawings, in another preferred embodiment of the invention the band saw 40 is characterized by a band mill 41, having a top head 42 which rotates on a top head shaft 42a, and a bottom head 43 which rotates on a bottom head shaft 43a to drive a flexible saw blade 45, as illustrated in FIGS. 2 and 3. The band mill 41 is pivotally mounted on a base 44 by means of a saw pivot pin 46 and the saw blade 45 extends around the top head 42 and bottom head 43 and is driven by a motor system (not illustrated) in conventional fashion. A saw positioning cylinder 47 is fitted with a linear positioner 23 and is mounted transverse to the longitudinal axis of the band saw 40, where it is secured to a cylinder bracket plate 19, mounted on the base 44 of the band saw 40. The cylinder piston 20 of the saw positioning cylinder 47 is, in turn, mounted on a cylinder piston plate 21, secured to the band mill 41. Accordingly it will be appreciated that the band mill, including the top head 42 and bottom head 43, as well as the saw blade 45, pivots about the saw pivot pin 46 by controlled operation of the saw positioning cylinder 47 to extend and retract the cylinder piston 20. A conveyor 49 is provided in the band saw 40 in conventional application as illustrated in FIGS. 2 and 3. As illustrated in FIG. 10, a saw V-way 48 serves to facilitate smooth pivoting of the band mill 41 with respect t the base 44 in the same manner as the carriage V-ways 26, heretofore described.

Referring again to FIGS. 1-3, 10, 13 and 14 of the drawings, a programmable logic controller 37 is located adjacent to the carriage 2 and is electrically connected to each of the linear positioners 23 mounted on the knee cylinders 29 which are connected to the carriage knees 24, and the carriage location encoder 33, in the cable drive system 65, as well as the linear positioners 23 provided on the carriage positioning cylinder 17 and saw positioning cylinder 47, respectively. The programmable logic controller 37 operates to position and secure a log 50 on the carriage 2 and selectively pivot the upper segment of the carriage 2 and the top head 42, bottom head 43 and saw blade 45 of the band mill 41, respectively, according to the curvature of the log 50 and log position input data from the carriage location encoder 33. One or more optimum saw cuts through the log having this curvature is initially determined by means of a scanner/computer 39, and this information may be manually loaded into the programmable logic controller 37 or optionally, into an interfacing computer 55 for automatic operation of the programmable logic controller 37, as hereinafter described.

Referring now to FIGS. 1-10, 13 and 14 of the drawings, in operation, a curved log 50 is initially positioned on the log support beams 9 of the carriage frame 3 by adjusting the knee cylinders 29 connected to the carriage knees 24 and locking the carriage knees 24 in place, to accommodate the curvature of the log 50, as illustrated. This adjustment is effected by initially operating the scanner/computer 39 to analyze the log 50 and subsequently either manually loading the scanner data directly into the programmable logic controller 37 or into the computer 55, for automatic operation of the programmable logic controller 37 by the computer 55. The inside edge 51 of the log 50 faces outwardly and is slightly concave, as illustrated in FIGS. 1 and 4, while the outside edge 60 is convex and is contacted by the carriage knees 24. A proposed saw line 52 is illustrated in phantom adjacent to the inside edge 51 of the log 50 and the saw line 52 is determined by the scanner/computer 39, which is typically a light curtain mounted above the carriage frame 3, as illustrated in FIGS. 2 and 3. When the scanner/computer 39 determines an optimum saw line 52 through the log 50, the scanner data may be manually entered into the programmable logic controller 37 by an operator, as described above. The machine is then utilized to automatically adjust the linear positioners 23 in the knee cylinders 29 and subsequently operate the remaining respective linear positioners 23 in the carriage positioning cylinder 17 and saw positioning cylinder 47 to pivot the carriage 2 and the band mill 41 and thus, the saw blade 45, with respect to the base 44. These adjustments maintain the saw blade 45 along the saw line 52 from the leading edge 53 to the trailing edge 54 of the log 50, as the carriage and the carriage trolley 11 advance in linear concert along the rail 10 and rail plate 10a. This traversal of the saw blade 45 through the log 50 along the preselected saw line 52 is effected by conventional operation of the cable drive system 65, illustrated in FIG. 13, and is illustrated in FIGS. 4-9, wherein FIG. 9 illustrates a cut 52a, where the saw blade 45 has completed traversal of the saw line 52 to effect removal of a curved slab 55 from the log 50. Incremental movement of the carriage 2 linearly along the guide rail 10 and rail plate 10a is sensed by the carriage location encoder 33, mounted on the output shaft 60 of the cable drive system 65 and this movement, as well as pivoting of the top segment of the carriage frame 3 on the carriage pin pivot 16, along with pivoting of the band mill 41 on the saw pivot pin 46, are illustrated in FIGS. 1 and 10. As the carriage 2 moves linearly in the direction of the arrows, respectively, small successive incremental carriage positions 63 are illustrated in phantom and the leading end increments 56 and trailing end increments 58 of the log 50, as well as incremental band mill positions 64 and incremental carriage pivot pin locations 62, show minute changes in the pivoted position of the top segment of the carriage frame 3 and band mill 41, as well as the log 50, by operation of the programmable logic controller 37. Accordingly, it will be appreciated by those skilled in the art that after the scanner/computer 39 determines an optimum saw line 52 in the log 50 and the log 50 is appropriately adjusted o the carriage 2 by operation of the programmable logic controller 37, the operator may manually prepare the programmable logic controller 37 to cause the saw blade 45 to traverse this saw line 52 according to predetermined incremental carriage positions 63 and incremental band mill positions 64. Orchestration in pivoting of the carriage 2 and the band mill 41 as a function of linear movement of the carriage 2 and sensing of the incremental positioning of the carriage 2 by the carriage location encoder 33, facilitate precise traversal of the saw blade 45 along the saw line 52 to achieve the cut 52a and this precision is aided by the embodiment illustrated in FIGS. 10-12, wherein the carriage V-way 26 and corresponding V-way receptacles 30, as well as the saw V-way 48, are utilized for the purposes heretofore described.

Referring again to FIGS. 1, 10 and 14 of the drawings, in a most preferred embodiment of the invention, a computer 55 is electronically connected to the programmable logic controller 37, carriage location encoder 33 and the scanner/computer 39, for operating the programmable logic controller 37 responsive to data received from the scanner/computer 39 and the carriage location encoder 33. Alternatively, carriage linear position data may be provided from the carriage location encoder 33 directly to the programmable logic controller 37. Accordingly, the pivoting carriage and saw 1 is then completely automated from the log loading and scanning sequence to the cutting sequence, as illustrated in FIGS. 1 and 14. The log 2 is initially scanned by the scanner/computer 39 to assess the log 50 as to optimum proposed saw line(s) 52 and optimize products from the log 50. The carriage knees 24 are then operated by energizing the knee cylinders 29 responsive to automatic operation of the programmable logic controller 37 and the corresponding linear positioners 23, according to information supplied to the programmable logic controller 37 by the computer 55, received from the scanner/computer 39. After the log 50 is so adjusted, the carriage trolley 1 and carriage 2 are caused to linearly traverse the guide rail 10 and rail plate 10a by operation of the cable drive system 65, as heretofore described. The programmable logic controller 37 then operates the respective carriage positioning cylinder 17 and saw positioning cylinder 47 by means of the respective associated linear positioners 23 and the carriage location encoder 33, according to instructions from the computer 55.

Sequential movement of the carriage 2 and carriage trolley 11 along the guide rail 10 and rail plate 10a to cut the log 50 is illustrated in FIGS. 4-9. In FIGS. 4 and 5 the log 50 is cut to approximately the midpoint by the band saw 40, along an essentially straight cut 52a. The cut 52a becomes more curved, as illustrated in FIGS. 6-9, thus necessitating pivoting of the carriage frame 3 on the carriage pivot pin 16 and the top head 42 of the band saw 40 on the saw pivot pin 46, as described above.

It will be appreciated by those skilled in the art that while the pivoting carriage and saw of this invention is designed to effect curved cuts through curved logs, it is also capable of cutting straight cuts through logs of various description, as described in FIGS. 4 and 5, according to the desires of the user. These cuts may be effected manually or automatically in the manner described above. Accordingly, while the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A pivoting carriage and saw for positioning and cutting logs, comprising a trolley adapted for linear travel; drive means connected to said trolley for operating said trolley in said linear travel; a carriage assembly pivotally carried by said trolley and adapted for receiving a log and carrying the log during linear travel of said trolley; a first fluid cylinder carried by said carriage assembly and said trolley for pivoting said carriage assembly with respect to said trolley; at least one log positioning knee slidably carried by said carriage assembly in spaced relationship and at least one knee cylinder connected to said carriage assembly and said knee, respectively, for seating said log-positioning knee against the log and stabilizing the log on said carriage assembly; a band saw base positioned adjacent to said trolley and a band saw pivotally mounted on said band saw base, said band saw having a continuous blade positioned in the path of travel of the log; a second fluid cylinder carried by said band saw base and said band saw for pivoting said band saw with respect to said band saw base; and computerized control system means electrically connected to said first fluid cylinder, said knee cylinder and said second fluid cylinder, whereby the log is stabilized on said carriage assembly by automatic operation of said knee cylinder, and said carriage assembly and said band saw are pivoted in concert with respect to said trolley and said band saw base, respectively, by automatic operation of said first fluid cylinder and said second fluid cylinder, respectively, for cutting the log responsive to said linear travel of said carriage assembly, the log and said trolley past said band saw responsive to operation of said computerized control system means.

2. The pivoting carriage and saw of claim 1 further comprising linear positioners mounted on said first fluid cylinder, said knee cylinder and said second fluid cylinder, respectively, and wherein said computerized control system means further comprises a scanning and computing means spaced from said carriage assembly for evaluating the log and a programmable logic controller electrically connected to said linear positioners, respectfully, whereby said programmable logic controller is provided with information from said scanning and computing means to operate said linear positioners, respectfully.

3. The pivoting carriage and saw of claim 2 further comprising at least one carriage location encoder electrically connected to said drive means and a computer electrically connected to said scanning and computing means, said carriage location encoder and said programmable logic controller for automatically providing said programmable logic controller with information from said scanning and computing means to locate and cut said preselected saw line according to the shape of the log.

4. A pivoting carriage and saw for positioning and cutting logs, comprising at least one trolley for linear travel; drive means connected to said trolley for operating said trolley in said linear travel; a carriage location encoder electrically connected to said drive means; a lower carriage assembly carried by said trolley in fixed relationship and an upper carriage assembly pivotally mounted on said lower carriage assembly for receiving a log and carrying the log during linear travel of said trolley; a first fluid cylinder carrier by said lower carriage assembly and said upper carriage assembly for pivoting said upper carriage assembly with respect to said lower carriage assembly; at least two log positioning knees slidably carried by said upper carriage assembly in spaced relationship and knee cylinders connected to said upper carriage assembly and said knees, respectively, for seating said log-positioning knees against the log and stabilizing the log on said upper carriage assembly a band saw base positioned adjacent to said trolley and a band saw pivotally mounted on said band saw base, said band saw having a continuous blade positioned in the path of travel of the log; a second fluid cylinder carried by said band saw base and said band saw for pivoting said band saw with respect to said band saw base; a first linear positioner mounted on said first fluid cylinder, a second linear positioner mounted on said second fluid cylinder and at least one-third linear positioner mounted on said knee cylinders for controlling the operation of said first fluid cylinder, said second fluid cylinder and said knee cylinders, respectively; a scanning and computing means positioned above said upper carriage assembly for assessing the log; a programmable logic controller electrically connected to said carriage location encoder, said first linear positioner, said second linear positioner and said third linear positioner for controlling said first fluid cylinder, said second fluid cylinder and said knee cylinder, respectively, and a computer electrically connected to said scanning and computing means and said programmable logic controller, whereby the log is stabilized on said upper carriage assembly by automatic operation of said knee cylinders and said upper carriage assembly and said band saw are pivoted in concert with respect to said lower carriage assembly and said band saw base, respectively, by automatic operation of said first fluid cylinder and said second fluid cylinder, respectively, for cutting the log responsive to said linear travel of said upper carriage assembly, the log and said trolley past said band saw.

5. The pivoting carriage and saw of claim 4 further comprising carriage V-way means provided in said upper carriage assembly and said lower carriage assembly for stabilizing the pivot of said upper carriage assembly with respect to said lower carriage assembly.

6. The pivoting carriage and saw of claim 4 further comprising saw V-way means provided in said band saw for stabilizing the pivot of said band saw with respect to said band saw base.

7. The pivoting carriage and saw of claim 4 further comprising a band saw base and a band saw pivotally mounted on said band saw base and further comprising:
   (a) carriage V-way means provided in said upper carriage assembly and said lower carriage assembly for stabilizing the pivot of said upper carriage assembly with respect to said lower carriage assembly; and
   (b) saw V-way means provided in said band saw for stabilizing the pivot of said band saw with respect to said band saw base.

* * * * *